United States Patent [19]

Agrawal

[11] Patent Number: 5,289,688
[45] Date of Patent: Mar. 1, 1994

[54] INTER-COLUMN HEAT INTEGRATION FOR MULTI-COLUMN DISTILLATION SYSTEM

[75] Inventor: Rakesh Agrawal, Allentown, Pa.

[73] Assignee: Air Products and Chemicals, Inc., Allentown, Pa.

[21] Appl. No.: 793,032

[22] Filed: Nov. 15, 1991

[51] Int. Cl.$^5$ ................................................ F25J 3/04
[52] U.S. Cl. ......................................... 62/24; 62/23; 62/27; 62/22; 62/31; 62/32; 62/33
[58] Field of Search ................... 62/22, 23, 24, 27, 31, 62/33, 34

[56] References Cited

U.S. PATENT DOCUMENTS

| | | | |
|---|---|---|---|
| 4,025,398 | 5/1977 | Haselden | 203/25 |
| 4,234,391 | 11/1980 | Seader | 203/26 |
| 4,473,385 | 9/1984 | Fabian et al. | 62/31 X |
| 4,568,528 | 2/1986 | Cheung | 62/22 |
| 4,575,388 | 3/1986 | Okada | 62/31 X |
| 4,592,767 | 6/1986 | Pahade et al. | 62/31 |
| 4,605,427 | 8/1986 | Erickson | 62/22 |
| 4,664,686 | 5/1987 | Pahade et al. | 62/31 X |
| 4,747,859 | 5/1988 | Gladman et al. | 62/22 |
| 4,805,412 | 2/1989 | Colley, deceased et al. | 62/22 |
| 4,824,453 | 4/1989 | Rottmann et al. | 62/22 |
| 4,883,517 | 11/1989 | Rathbone | 62/24 X |
| 4,902,321 | 2/1990 | Cheung | 62/24 |
| 5,049,174 | 9/1991 | Thorogood et al. | 62/22 X |

OTHER PUBLICATIONS

Z. Fidkowski and L. Kralikowski "Minimum Energy Requirements of Thermally Coupled Distillation Systems" AIChE Journal Apr. 1987 vol. 33, No. 4 pp. 643–653.

B. Linhoff, H. Dunford, R. Smith "Heat Integration of Distillation Columns Into Overall Processes" Chemical Engineering Science vol. 38, No. 8 pp. 1175–1188, 1983.

L. R. Lynd, H. E. Grethlein, "Distillation with Intermediate Heat Pumps and Optimal Sidestream Return" AIChE Journal, Aug. 1986 vol. 32, No. 8 pp. 1347–1359.

Primary Examiner—Henry A. Bennet
Assistant Examiner—Christopher B. Kilner
Attorney, Agent, or Firm—Russell L. Brewer; James C. Simmons; William F. Marsh

[57] ABSTRACT

This invention relates to an improvement in a process for the separation of a multi-component stream by distillation. A multi-component feed is introduced to a multi-column distillation system comprising a main column and a side column wherein at least a light component A is separated from a heavier component C in the main column, the lighter component A being removed as an overhead fraction and the heavier component C being removed as a bottoms fraction. The improvement for enhanced recovery of a component in the side column comprises withdrawing a liquid fraction from the main column at a point intermediate the overhead and bottoms and introducing that liquid fraction to an upper portion of the side column. Lighter components are withdrawn from the side column and returned to an optimal location in the distillation system, typically the main column. Reboiling in the side column is effected by removing a portion of the liquid typically from the bottom of this column and vaporizing this fraction against a vapor fraction obtained from the main column. At least a portion of the vapor fraction from the main column is condensed and liquid is returned to an optimal point in the main column distillation system. The vapor fraction withdrawn from the main column and used to vaporize the bottoms of the side column is withdrawn at a point below the liquid removal point for the liquid feed to the side column.

9 Claims, 3 Drawing Sheets

INTER-COLUMN HEAT INTEGRATION FOR MULTI-COLUMN DISTILLATION SYSTEM

TECHNICAL FIELD

This invention relates to an improvement in a process for the heat integration of thermally coupled columns in a multi-column distillation system.

BACKGROUND OF THE INVENTION

Fractional distillation of multi-component streams to effect separation is a well known chemical engineering process and is used extensively in the chemical industry. It is well recognized that although distillation is widely used, it is also energy-intensive and often is the dominant cost in a distillation process. With rising energy costs, efforts have been made to enhance the efficiency of the distillation process through thermal coupling or through the use of heat pumps and the like. Representative art illustrating the enhancement of distillation efficiency via heat pumps or thermal coupling include the following:

An article entitled "*Minimum Energy Requirements of Thermally Coupled Distillation Systems*", AICHE Journal, Vol. 33, No. 4, (pp. 643-653, April 1987) discloses four different thermally coupled distillation systems consisting of distillation columns connected by liquid and vapor counter-current streams. One embodiment shows thermal coupling to a main column with a side arm column wherein a vapor is removed from the rectification zone in the main column and fed to an upper portion of the side column. A liquid stream from the side column then is returned as reflux to the rectification zone in the main column. Optionally, a liquid is removed from the stripping section of the main column and fed to a lower portion of the side column. The vapor is returned to the stripping zone of the main column. Another embodiment shows a thermally coupled system associated with a stripping column wherein liquid is removed from the main column and introduced to an upper portion of the stripping column. Lighter components are removed therefrom with the vapor from the stripping column being returned to the main column. Reboilers are associated with both the main column and stripping column to provide boilup. (Page 647)

An article entitled "Heat Integration of Distillation Columns Into Overall Processes", Chem. Engineering Science, Vol. 38, No. 8, pages 1175-1188 (1983), discloses energy enhancing techniques for the separation of multi-component systems in a multi-column distillation process. It was noted in a conventional method that reactor feeds were preheated with other process streams and steam before passing through a furnace. Steam was used as a heat source for the reboilers. The process incorporated the use of a distillation train feed in the reboiler of the first column for effecting vaporization of the liquid at the bottom, thus reducing the need for steam.

An article entitled "*Distillation with Intermediate Heat Pumps and Optimal Side Stream Return*", AICHE Journal, Vol. 32, No. 8, pages 1347-1359, (August 1986), discloses the separation of multi-component streams using a multicolumn distillation system. The term "heat pump" as conventionally used in these systems referred to the removal of heat from a location in the rectification section in the distillation column to the stripping section of the distillation column. One of the simpler techniques used in the prior art involved the movement of heat from the overhead vapor in a distillation system to the reboiler in an adiabatic column to effect an alteration of the internal reflux ratio. Examples of various methods of altering the internal reflux ratio involved by removing vapor from a column at a point above a feed plate, condensing that vapor fraction in a reboiler and returning it to an optimal location. Another process scheme involves removal of liquid from the stripping section of a column, vaporizing at the expense of compressed overhead vapor, and returning to an optimal point in the column.

U.S. Pat. No. 4,025,398 discloses a fractional distillation process wherein multiple columns are intercoupled to provide variable reboil and variable reflux so as to approach thermodynamically ideal fractionation. The system comprised a variable reboiler column and a variable reflux column wherein the variable reflux column was operated at a higher pressure and mounted at a lower level than the variable reboil column. Vapor was drawn from the variable reflux column, condensed at an upper level in the variable reboil stripping column and returned to the variable reflux column.

U.S. Pat. No. 4,234,391 discloses a continuous distillation apparatus incorporating separate stripping and rectifying sections in tandem, each of which are segregated into a plurality of vapor/liquid contact stages. In the process, the rectifying section of the column is operated at a higher pressure than the stripping section and this is achieved by compressing vapor from the stripping section prior to introducing the vapor into the rectifying section.

U.S. Pat. No. 4,605,247 discloses a process for the production of medium to high purity oxygen as well as other components contained in air. A triple pressure distillation process is developed in which the low pressure column has an argon stripping section and a rectification section reboiled by the high pressure column. At least one latent heat exchange is made from an intermediate height of the low pressure column with an intermediate height in a moderate pressure column. Latent heat exchanges are used to insure high reboil through the argon stripping section of the low pressure column.

SUMMARY OF THE INVENTION

This invention relates to an improvement in a process for the separation of a multi-component feed by distillation. A multi-component feed is introduced to a multi-column distillation system comprising a first or main column and a side column wherein at least a light component A is separated from a heavier component C in the first column, the lighter component A being removed as an overhead fraction and the heavier component C being removed as a bottoms fraction. In the distillation of a multi-component stream containing more than two components, e.g., components A, B & C or in the distillation of a binary stream containing components A & B and volatile impurities I for producing component A at dissimilar purities, a side column is used on occasion for such separation and recovery. The improvement for enhanced recovery of a component in the side column comprises the initial step of withdrawing a liquid fraction from the main or first column at a point intermediate the overhead and bottoms and introducing that liquid fraction to an upper portion of the side column. Lighter components are withdrawn from the side column and returned to an optimal location in the distillation system, typically the main column. Reboiling in the side column is effected by vaporizing a portion of the liquid in the side column against a vapor fraction obtained from the main column. Generally, the liquid fraction which is vaporized against vapor from the main column is a bottoms liquid fraction. At least a portion of the vapor fraction from the main column is condensed and liquid is returned to an optimal point in the main column distillation system, typically to the point of vapor removal point from the main column. The vapor fraction withdrawn from the main column and used to vaporize the bottoms of the side column is withdrawn at a point below the liquid removal point for the liquid feed to the side column.

There are significant advantages associated with the unique thermal coupling of columns in a distillation system as described herein. These include:

effective and efficient heat integration in the distillation columns for ternary separation;

enhanced recovery of components in a side column which is thermally coupled to the main column for ternary separation;

enhanced efficiency in the separation of components in the main column; and thermal coupling can be effected without substantial equipment costs in the form of compressors, etc.

THE DRAWINGS

DETAILED DESCRIPTION OF THE INVENTION

Distillation of multi-component streams or feeds containing more than two components, e.g., components A, B and C wherein components A and C are the light and heavy components respectively and B is a component having a volatility intermediate of A and B or essentially binary streams, e.g., a stream containing component A and component C contaminated with small amounts of at least one highly volatile impurity (I) wherein component A is generated as two different products of dissimilar purity can be effectively conducted by the process described herein. Ternary streams include hydrocarbon streams such as those containing methane, ethane, propane and heavier components or an essentially binary stream, such as, an air stream wherein the major components include nitrogen as component A, oxygen as component C and with minor components comprising argon and impurities I such as hydrogen, helium and neon.

Figure 1:
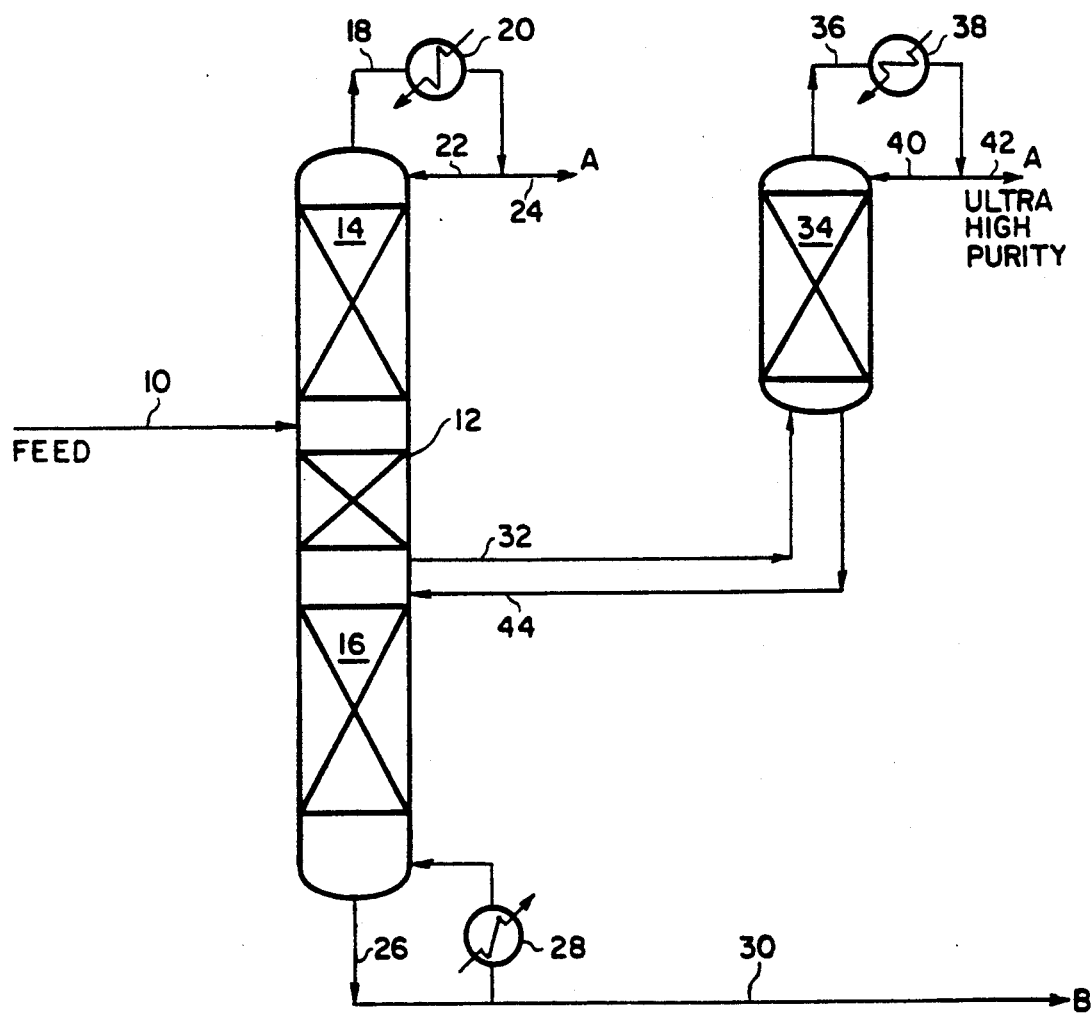
FIG. 1 is a process flow diagram employing a thermally coupled side column where thermal coupling is in the lower section.

To facilitate an understanding of the invention reference is made to FIG. 1. This process flow diagram involves the distillation of a ternary gas mixture comprising components A, B and C wherein components A and C are the light and heavy components respectively and component B has a volatility intermediate to that of component A and component C. In this process a multicomponent feed comprising components A, B, and C is introduced via line 10 to a first or main distillation column 12 having rectification zones R1, R2, and R3 and a stripping zone S1. Distillation column 12 is equipped with a reboiler 14 for effecting boilup of liquid in the bottom of the column and a condenser 16 for condensive overhead vapor from the top of the column. Line 17 is used to return condensate from condenser 16 to the rectification zones for providing reflux thereto. Line 18 is used for removal of component A as product. Component C is removed from the main column 12 as a bottoms fraction via line 19 and a vaporized portion is returned via line 21.

Component B is separated from components A and C in side column 22. In this embodiment side column is a stripping column wherein a liquid enriched in component B and containing only minor levels of heavier components, e.g., component C is withdrawn from main distillation column 12 via line 24 and introduced to an upper portion of side column 22. Liquid descends column 22 and is contacted with upwardly rising vapor. Vapor is removed from an upper portion of side column 22 via line 26 and returned to a optimal point in the distillation system. Typically, this return will be at a point substantially near the liquid removal point from main distillation column to side column 22. In this case vapor is returned to the rectification zone R1 in first column 12. A liquid fraction enriched in component B is removed from the bottom portion of side column 22 via line 28 and a portion thereof removed as product via line 30.

Boilup in side column 22 is achieved by means of boiler/condenser 32. Any liquid removed from the bottom of the side column is removed via line 28 and not recovered as product via line 30 is vaporized in boiler/condenser 32. Vaporization is effected in boiler/condenser 32 and the resulting vapor is returned to a lower portion of side column 22. Although boiler/condenser 32 is placed outside side column 22, it may be placed within side column 22 or appropriately placed in main distillation column 12. The advantage of boiler/condenser 22 being removed from side column 22 is that liquid volumes via stream 28 and 30 may be controlled.

Thermal integration of side column 22 is achieved in an efficient manner by removal of a vapor stream via line 34 at a point above feed line 10 to first or main distillation column 12. The selection of an appropriate vapor stream is based primarily on the temperature of the vapor stream. Typically this stream is chosen such that minimum temperature approach between the condensing and the boiling streams in boiler/condenser 32 will be within a range of 0.25° to 3° C. for cryogenic distillation systems and from 5°–75° C. for elevated temperature distillation systems. This vapor stream is at least partially condensed in boiler/condenser 32 against the liquid from the bottom of side column 22 and conveyed to separator 36. Uncondensed vapor is returned via line 38 to an optimal point in first distillation column 12 while the liquid is returned via line 40 to first distillation column 12. Typically the point of return for both vapor and liquid is in the zone of first or main column 12 where the vapor is removed via line 34.

Alternatively, a smaller flow of vapor may be drawn from the main column 12 via line 34 and totally condensed in the boiler/condenser 32. This totally condensed stream is then preferably introduced to a lower position of the rectification zone R2 via line 40 as impure reflux to main distillation column 12.

The process described exhibits enhanced efficiency because it thermally integrates a portion intermediate the bottom and overhead of main column 12 with side column 22. Recovery can be enhanced because the feed rate to side column 22 via line 24 can be increased without adversely affecting the performance of the main column. When all of the vaporization function of side column 22 is provided by other process streams or external heat source, as in the prior art, there is a limit to the amount of liquid that can be removed via line 24 to side column 22 because of a "pinch" in rectification section R2 occurs. In order to increase the amount of liquid to side column 22, and thus obtain a higher recovery of B, more boilup and condensation duty are required in main distillation column 12. In contrast, by effecting thermal integration as shown, i.e. wherein a vapor is removed via line 34 intermediate the feed point and overhead in main distillation column 12 and a liquid fraction returned via line 40, the required L over V for distillation is maintained at lower energy consumption.

Figure 2:
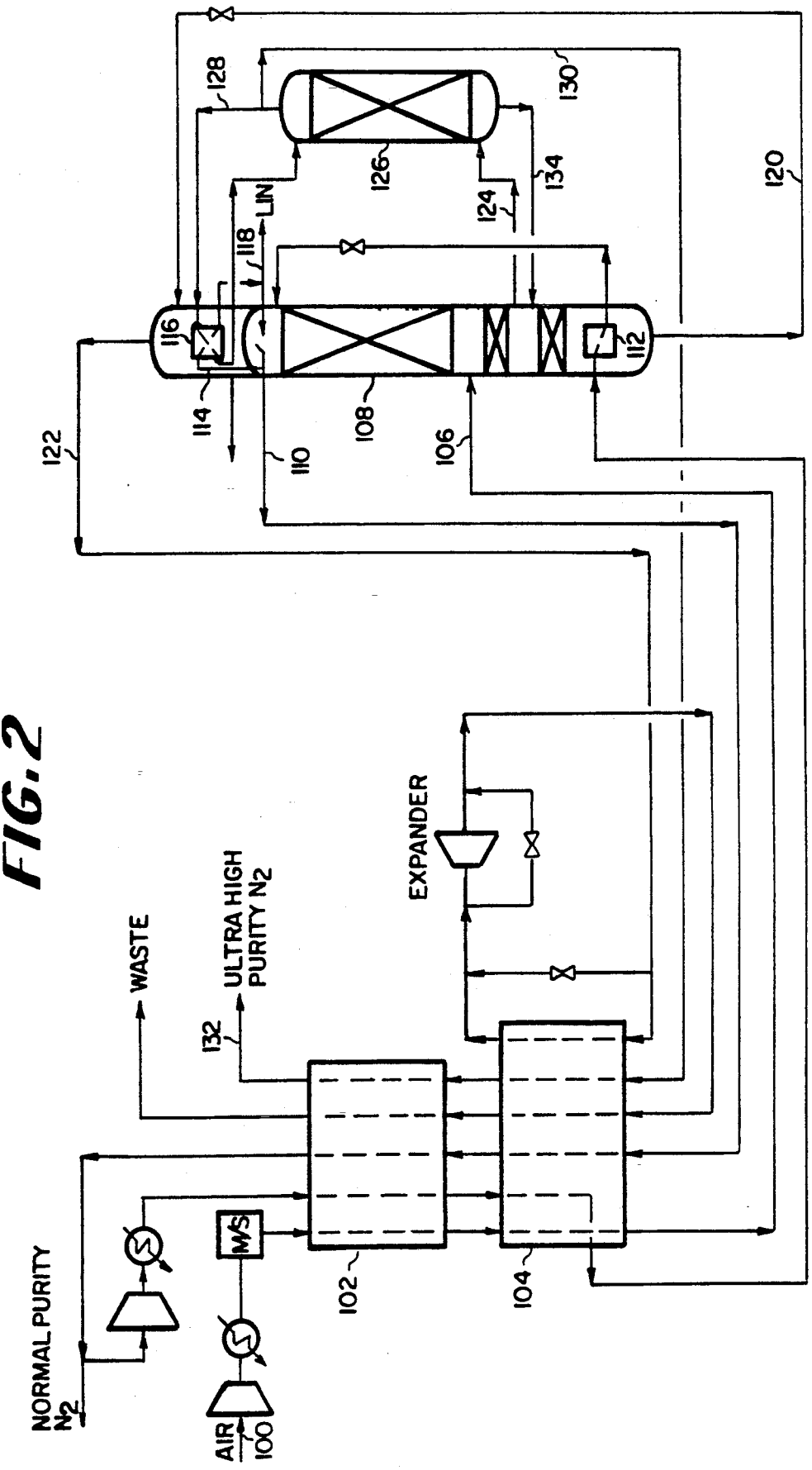
FIG. 2 is a process flow scheme for a distillation system employing thermal coupling in a side column in both lower and intermediate sections of the side column.

FIG. 2 illustrates a variation on the embodiment shown in FIG. 1. Numerals in FIG. 1 used for equipment and process lines where similar are identical except that a series 200 numbers is used. Process differences are noted through the use of additional numbers in the 200 series.

One of the basic differences between the embodiment shown in FIG. 2 and that of FIG. 1 is in the effecting of a second and intermediate thermal coupling of main column 212 with side column 222 in addition to thermal coupling of the bottom portion of side column 222. In this embodiment a vapor stream is removed via line 244 in an upper portion, but intermediate the introduction of multi-component feed and overhead of main column 212 and at least partially condensed against a liquid fraction obtained from an upper portion of side column 222 in boiler/condenser 242. The stream is returned via line 250 to main column 212. If partially condensed, this stream is returned to the point where the vapor stream was removed. This condensate provides reflux for rectification zone R300. As in the embodiment described in FIG. 1, a portion or all of the condensate in line 250 could be introduced to a lower portion of rectification zone R200 to facilitate distillation in that section. This is preferentially done when the condensate in line 250 is nearly totally condensed. As with the process scheme of FIG. 1, the temperature of the vapor stream in line 244 is generally such that the minimum temperature approach between the condensing and the boiling streams in boiler/condenser 242 is at least 0.25° C. Liquid from an intermediate location of the side column 222 is removed via line 246 and vaporized in boiler/condenser 242 and returned to side column 222. The return point is generally at the same location as the liquid removal point. In FIG. 2, it is optionally possible to decrease the flowrate of liquid in line 246 such that it is totally vaporized in boiler/condenser 242. In such a case, the vaporized stream is then returned to the side column 222 at a location which is a couple of theoretical stages of separation below the removal point for liquid in line 246. By employing an intermediate boilup in side column 222, one can increase the feed rate to the side column which will increase recovery of component B. Optionally, intermediate thermal coupling may be used as the sole thermal coupling thereby eliminating thermal coupling of the bottom of side column 222. In that case reboiling at the bottom is effected with process streams or steam. However, as a practical matter thermal coupling is generally associated with the bottom of side column 222.

Figure 3:
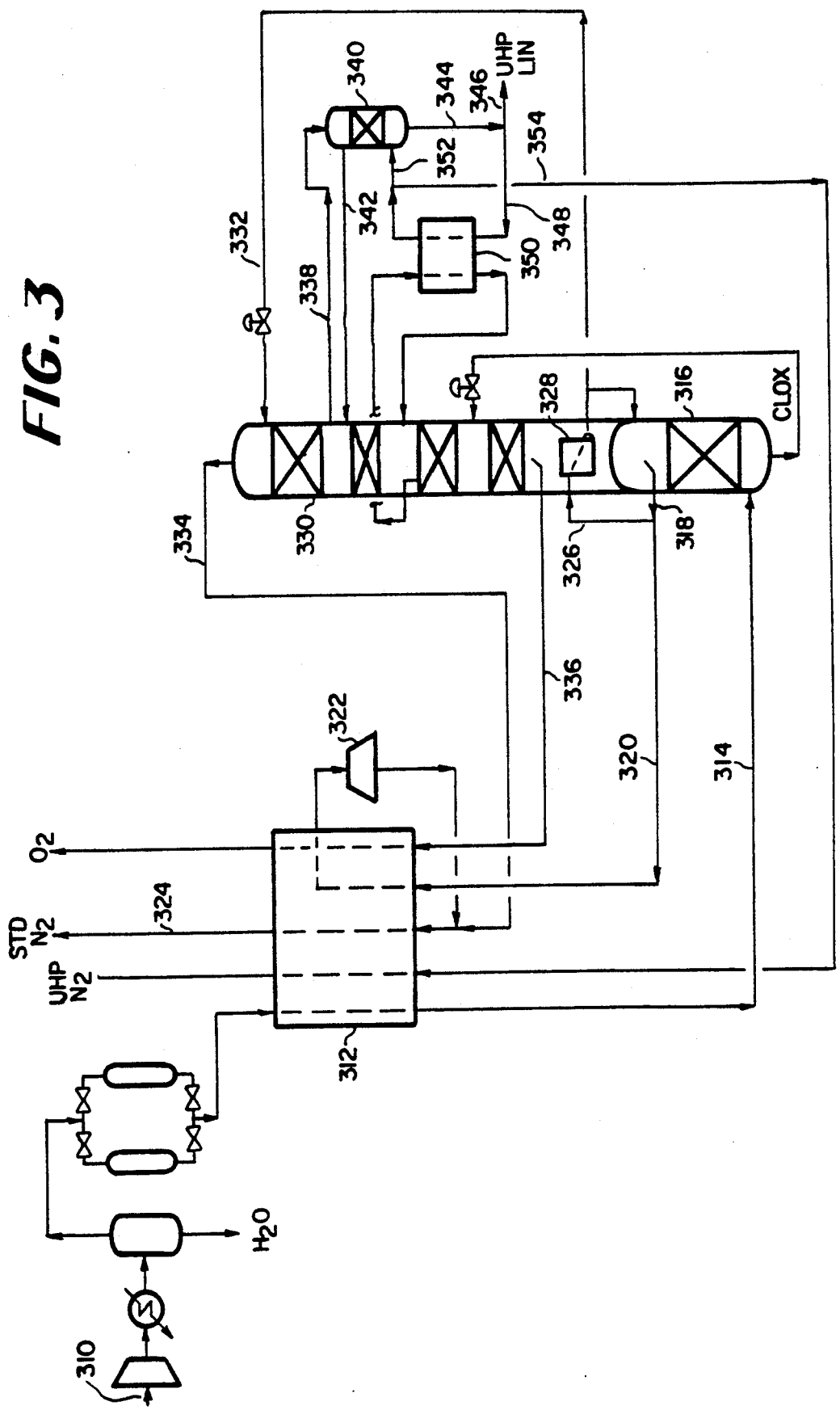
FIG. 3 is a process flow scheme for an air separation process employing a combination of a high and low pressure column as the main column in the distillation system.

FIG. 3 represents an embodiment of a modified doublecolumn air separation system for the separation of air into its components generating a standard nitrogen product contaminated with minor amounts of impurities, e.g., hydrogen, helium, and neon, and an ultra high purity liquid nitrogen product which contains less than about 0.1 ppm impurities. The double column process is relatively of a conventional design with respect to the preparation of standard nitrogen product. The difference between this embodiment and a conventional process is in the thermal coupling of the side column to the low pressure column for the production of ultra high purity nitrogen. To facilitate an analysis of this embodiment, air is introduced via line 310 to a compressor wherein it is compressed to conventional pressure of from 70 to 250 psia and cooled. Water and other high freezing point contaminants such as carbon dioxide are removed via molecular sieves arranged for alternate sequential operation. This stream is further cooled to essentially its dewpoint temperature in heat exchanger 312 and introduced via line 314 to the bottom of high pressure column 316 for separation into its components. A nitrogen rich product is generated as an overhead in the top of high pressure column 316 and a crude liquid oxygen product is generated in the bottom portion thereof. A portion of the nitrogen vapor from high pressure column 316 is removed via line 318 with one portion being conveyed via line 320 to main heat exchanger 312. This nitrogen vapor then is isentropically expanded in expander 322 and warmed against process streams prior to recovery from main heat exchanger 312 via line 324. The balance of the nitrogen vapor from line 318 is conveyed via line 326 to boiler/condenser 328 in the lower portion of low pressure column 330. This stream is condensed with a portion being returned to high pressure column 316 as reflux. The balance is conveyed via line 332, expanded and introduced to an upper portion of low pressure column 330 as reflux.

The first or main column in this system comprises the combination of the low pressure and high pressure column. Low pressure column 330 is operated at a pressure ranging from 15 to 85 psia. A nitrogen rich vapor fraction is removed as an overhead via line 334 wherein it is combined with the expanded nitrogen from line 320 and recovered as product. Gaseous oxygen is removed from the bottom of low pressure column 330 via line 336 and warmed against process streams in main heat exchanger 312.

Ultra high purity nitrogen is generated as a coproduct in addition to standard nitrogen product. In generating ultra high purity nitrogen, a liquid stream which is essentially free of heavy contaminants (C) such as oxygen and argon is removed from an upper portion of low pressure column 330 via line 338. The concentration of volatile contaminants (I) such as hydrogen, helium and neon in this stream is generally less than 10 ppm by volume. This stream is introduced to side column 340 for effecting stripping and removal of residual volatiles which may be dissolved in the liquid nitrogen stream. In side column 340 a vapor fraction is generated in an upper part and removed via line 342. This fraction is then returned to essentially the same location that the liquid fraction was removed from low pressure column 330.

A liquid product is generated in the bottom of stripping column 340 and removed via line 344 with a portion being recovered via line 346 as ultra high purity liquid nitrogen product containing less than 0.1 ppm of volatile contaminants such as hydrogen, helium and neon. The balance is conveyed via line 348 to boiler/condenser 350 where it is vaporized against a vapor fraction from the low pressure column. A portion of the vaporized fraction from line 348 is introduced to side column 340 via line 352 for providing vapor to effect distillation in side column 340 while the balance is removed via line 354 and warmed against process streams in main heat exchanger 312 to provide ultra high purity gaseous nitrogen product.

Because of the thermal integration of side column 340 with low pressure column 330 in the manner described, substantial quantities of ultra high purity nitrogen may be obtained as liquid via line 346 and as vapor via line 354. It is noteworthy that this product can be recovered in high yield without significant changes in energy consumption of the process.

The embodiment of FIG. 3 may be modified by utilizing a single column in place of high pressure column 316 and low pressure column 330. A single column nitrogen generator would operate in the range from 3 to 12 atmospheres and act as a high pressure rectifier. Typically, the single column will differ from the dual column process in that separation is effected by high pressure rectification as opposed to a combination of high pressure rectification and low pressure distillation.

It is apparent that other process schemes can be utilized which are variations of those described in FIGS. 1, 2 and 3 without altering their basic concepts. For example, a series of side columns can be associated with a first or main column. This would permit recovery of components D, E, etc. in addition to components A, B, & C from a multicomponent stream. Additionally, an auxiliary boiler/condenser may be used in combination with the thermally linked boiler/condensers associated with the main distillation column and side column described in the various embodiments of the invention, e.g., boiler/condenser 32, 232, and 350. These auxiliary boiler/condensers or reboilers would use other process streams or steam for effecting boilup in the bottom of the side column as described. The utilization of auxiliary boiler/condensers. however, would be at the discretion of the operator.

What is claimed is:

1. In a process for separation of a multi-component stream comprising at least one volatile component A and at least one component of lower volatility C, said multi-component stream contaminated with impurities I having a volatility greater than component A wherein said multi-component stream is introduced to a multi-column distillation system incorporating a side column having a reboiler associated therewith, said side column effecting separation and recovery of at least one component in said multi-component stream, the improvement which comprises:

(a) introducing said multi-component stream to a first column wherein a first column overhead fraction enriched in component A and a first column bottoms fraction enriched in component C is obtained;

(b) withdrawing a first column liquid fraction containing A contaminated with impurities I from said first column at a point intermediate said first column overhead fraction and an introduction point of said multi-component stream to said first column;

(c) introducing said first column liquid fraction to an upper portion of said side column and recovering component A contaminated with impurities I as a first side column overhead fraction and recovering A of high purity as a first side column bottoms fraction;

(d) withdrawing from said side column a first side column liquid fraction for vaporizing at least a portion thereof in a boiler/condenser;

(e) withdrawing a first column vapor fraction from said first column at a point intermediate the introduction point of said multicomponent stream to said first column and a withdrawal point of said first column liquid fraction and condensing at least a portion of said first column vapor fraction against said first side column liquid fraction in said boiler/condenser as set forth in step (d); (f) recovering and returning at least a portion of resulting vaporized first side column liquid fraction to said side column; and (g) recovering and utilizing at least a portion of resulting condensed first column vapor fraction obtained in step (e) as reflux in said multi-column distillation system.

2. In a process for separation of a multi-component stream comprising at least one volatile component A and at least one component of lower volatility C and a component B having a volatility intermediate that of A and C wherein said multi-component stream is introduced to a multi-column distillation system incorporating a side column having a reboiler associated therewith, said side column effecting separation and recovery of at least one component in said multi-component stream, in improvement which comprises:

(a) introducing said multi-component stream to a first column wherein a first column overhead fraction enriched in component A and a first column bottoms fraction enriched in component C is obtained;

(b) withdrawing a first column liquid fraction from said first column containing components A and B at a point intermediate said first column overhead fraction and an introduction point of said multicomponent stream to said first column;

(c) introducing said first column liquid fraction to an upper portion of said side column, removing A as a first side column overhead fraction and recovering B as a first side column bottoms fraction;

(d) withdrawing a first side column liquid fraction from said side column for vaporizing at least a portion thereof in a boiler/condenser;

(e) withdrawing a first column vapor fraction from said first column at a point intermediate the introduction point of said multicomponent stream to said first column and a withdrawal point of said first column liquid fraction and condensing at least a portion of said first column vapor fraction against said first side column liquid fraction in said boiler/condenser as set forth in step (d);

(f) removing and returning at least a portion of a resulting vaporized first side column liquid fraction to said side column; and, (g) recovering and utilizing at least a portion of a resulting condensed first column vapor fraction obtained in step (e) for reflux in said multi-column distillation system.

3. The process of claim 1 wherein said multi-component stream is air and comprises nitrogen as said volatile component A, oxygen as said component C, and impurities I which have a higher volatility than nitrogen.

4. The process of claim 3 wherein said first side column overhead fraction is returned to said first column at a point substantially near a removal point of said first column liquid fraction from said first column.

5. The process of claim 4 wherein the resulting liquid fraction generated by condensation of said first column vapor fraction withdrawn from said first column is returned to a point substantially near that where said first column vapor fraction was withdrawn for condensation.

6. The process of claim 5 wherein thermal coupling is effected by vaporizing at least a portion of said first side column liquid fraction obtained from a lower section of said side column against said first column vapor fraction from said first column.

7. The process of claim 3 wherein said first column in multi-column system comprises a high pressure section and a low pressure section.

8. The process of claim 3 wherein a plurality of thermal integrations between said first column and said side column are effected, the first thermal integration involving the removal of a first side column liquid fraction obtained from a lower portion of the side column and vaporizing it against a first column vapor fraction obtained from a lower portion of the first column and at least a second thermal integration wherein a second column vapor fraction obtained from a point intermediate the introduction of the multi-component stream feed and first column overhead fraction is condensed against a second side column liquid fraction obtained from an upper portion of said side column.

9. The process claim of claim 1 wherein said first column vapor fraction obtained from said first column obtained in step (e) is totally condensed and is returned to the first column at a location point above the point from where said first column vapor fraction is taken for effecting condensation thereof and vaporization of said first side column liquid fraction from said side column.

* * * * *